(12) United States Patent
Wu et al.

(10) Patent No.: US 11,822,005 B2
(45) Date of Patent: Nov. 21, 2023

(54) RADAR COMMUNICATIONS WITH OFFSET CHIRP INTERVAL TIME

(71) Applicant: NXP B.V., Eindhoven (NL)

(72) Inventors: Ryan Haoyun Wu, San Jose, CA (US); Dongyin Ren, East Brunswick, NJ (US); Wendi Zhang, Munich (DE); René Geraets, Best (NL)

(73) Assignee: NXP B.V., Eindhoven (NL)

( * ) Notice: Subject to any disclaimer, the term of this patent is extended or adjusted under 35 U.S.C. 154(b) by 295 days.

(21) Appl. No.: 17/186,750

(22) Filed: Feb. 26, 2021

(65) Prior Publication Data
US 2022/0276338 A1    Sep. 1, 2022

(51) Int. Cl.
  *G01S 7/35* (2006.01)
  *G01S 13/58* (2006.01)

(52) U.S. Cl.
  CPC ............ *G01S 7/354* (2013.01); *G01S 13/583* (2013.01)

(58) Field of Classification Search
  CPC ................................ G01S 7/354; G01S 13/583
  See application file for complete search history.

(56) References Cited

U.S. PATENT DOCUMENTS

| | | | | |
|---|---|---|---|---|
| 3,831,174 A * | 8/1974 | King | ...................... | G01S 13/528 342/104 |
| 3,935,572 A * | 1/1976 | Broniwitz | .............. | H01Q 1/421 342/107 |
| 5,276,453 A * | 1/1994 | Heymsfield | ............. | G01S 13/30 342/112 |
| 7,400,290 B2 * | 7/2008 | Woodington | ........... | G01S 7/414 342/107 |
| 10,205,457 B1 * | 2/2019 | Josefsberg | .............. | H03L 7/091 |
| 11,402,483 B2 * | 8/2022 | Long | ....................... | G01S 13/89 |
| 2013/0188167 A1 * | 7/2013 | Halmos | .................... | G01S 17/58 356/4.01 |
| 2016/0131752 A1 * | 5/2016 | Jansen | .................... | G01S 13/42 342/27 |
| 2018/0011170 A1 * | 1/2018 | Rao | .......................... | G01S 13/92 |
| 2019/0242973 A1 * | 8/2019 | Schat | ..................... | G01S 7/4021 |
| 2020/0011968 A1 * | 1/2020 | Hammes | ................ | G01S 13/003 |
| 2020/0025906 A1 * | 1/2020 | Kesaraju | ................ | G01S 13/931 |

(Continued)

FOREIGN PATENT DOCUMENTS

WO    WO-2021189268 A1 *    9/2021    ............... G01S 7/35

OTHER PUBLICATIONS

Final Office Action; U.S. Appl. No. 17/233,952; 28 pages (dated Jun. 6, 2023).

(Continued)

*Primary Examiner* — Nuzhat Pervin

(57) ABSTRACT

Aspects of the present disclosure are directed toward apparatuses and/or methods involving the communication of radar signals. Certain aspects involve communicating time division multiplexing (TDM) multi-input multi-output (MIMO) radar signals, having pulses with a chirp interval time (CIT) that is different for respective chirps. Positional characteristics of a target may be ascertained based upon both the CIT between each chirp in the communicated radar signals and the time between each corresponding chirp in received ones of the signals reflected by the target. Communication of the radar signals may involve utilizing a combination of antennas to provide a virtual aperture.

20 Claims, 5 Drawing Sheets

(56) References Cited

U.S. PATENT DOCUMENTS

| | | | |
|---|---|---|---|
| 2020/0081110 A1* | 3/2020 | Nam | G01S 13/42 |
| 2020/0103515 A1* | 4/2020 | Kishigami | G01S 7/4026 |
| 2020/0158861 A1* | 5/2020 | Cattle | G01S 13/89 |
| 2020/0166598 A1* | 5/2020 | Dorn | G01S 3/46 |
| 2020/0233076 A1* | 7/2020 | Chen | G01S 7/4865 |
| 2020/0284874 A1* | 9/2020 | Narayana Moorthy | G01S 13/343 |
| 2020/0393553 A1 | 12/2020 | Kishigami et al. | |
| 2021/0026003 A1* | 1/2021 | Panzer | G01S 13/931 |
| 2021/0156980 A1* | 5/2021 | Stettiner | G01S 13/584 |
| 2021/0156981 A1* | 5/2021 | Stettiner | G01S 7/0232 |
| 2021/0156982 A1* | 5/2021 | Stettiner | G01S 13/931 |
| 2021/0229662 A1* | 7/2021 | Ozbilgin | G01S 13/08 |
| 2021/0333386 A1* | 10/2021 | Park | G01S 13/584 |
| 2022/0099795 A1* | 3/2022 | Crouch | G01S 7/354 |
| 2022/0099837 A1* | 3/2022 | Crouch | G01S 17/931 |
| 2022/0283286 A1 | 9/2022 | Wu et al. | |
| 2022/0342036 A1* | 10/2022 | Rao | G01S 13/343 |
| 2022/0413132 A1 | 12/2022 | Hasegawa | |

OTHER PUBLICATIONS

J. Bechter, F. Roos and C. Waldschmidt, "Compensation of Motion-Induced Phase Errors in TDM MIMO Radars," in IEEE Microwave and Wireless Components Letters, vol. 27, No. 12, pp. 1164-1166, Dec. 2017.

M. Kronauge, C. Schroeder and H. Rohling, "Radar target detection and Doppler ambiguity resolution," 11th International Radar Symposium, Vilnius, Lithuania, 2010, pp. 1-4.

M. Musa and S. Salous, "Ambiguity elimination in HF FMCW radar systems," in IEE Proceedings—Radar, Sonar and Navigation, vol. 147, Issue 4, pp. 182-188, Aug. 2000.

K. Thurn, D. Shmakov, G. Li, S. Max, M. Meinecke and M. Vossiek, "Concept and Implementation of a PLL-Controlled Interlaced Chirp Sequence Radar for Optimized Range-Doppler Measurements," in IEEE Transactions on Microwave Theory and Techniques, vol. 64, No. 10, pp. 3280-3289, Oct. 2016.

U.S. Appl. No. 17/187,789, filed Feb. 27, 2021, and entitled "Method and System for Time Division Multiplexing MIMO Radar Doppler Compensation Using Spurious Angle Spectrum Hypothesis Tests".

Guetlein, Johanna et al; "Motion Compensation for a TDM FMCW MIMO Radar System"; European Radar Conference; pp. 37-40; Oct. 9, 2013.

Roos, Fabian et al; "Enhancement of Doppler Unambiguity for Chirp-Sequence Modulated TDM-MIMO Radars"; IEEE MMT-S Int'l Conf. on Microwaves for Intelligent Mobility; 4 pages (Apr. 15, 2018).

Schmid, Christian M. et al; "Motion Compensation and Efficient Array Design for TDMA FMCW MIMO Radar Systems"; 6th European Conf. on Antennas and Propagation; pp. 1746-1750 (Jun. 1, 2021).

U.S. Appl. No. 17/233,952, filed Apr. 19, 2021, and entiled "Radar Communications With Disparate Pulse Repetition Intervals".

Nijsure, Yogesh et al., "Cognitive Chaotic UWB-MIMO Radar Based on Nonparametric Bayesian Technique", IEEE Transactions on Aerospace and Electronic Systems, Jul. 1, 2015, pp. 2360-2378, vol. 51, No. 3, IEEE, Piscataway, NJ, USA.

Shapir, I et al., "Doppler Ambiguity Resolving in TDMA Automotive MIMO Radar via Digital Multiple PRF", 2018 IEEE Radar Conference (Radarconf18), Apr. 23, 2018, pp. 175-180, IEEE, Piscataway, NJ, USA.

Non Final Office Action; U.S. Appl. No. 17/233,952; 38 pages (dated Dec. 7, 2022).

Non Final Office Action; U.S. Appl. No. 17/187,789; 49 pages (dated May 18, 2023).

Non Final Office Action; U.S. Appl. No. 17/233,952; 18 pages (dated Sep. 26, 2023).

* cited by examiner

RADAR COMMUNICATIONS WITH OFFSET CHIRP INTERVAL TIME

OVERVIEW

Aspects of various embodiments are directed to radar communications involving offset (e.g., varied) interval times between transmitted chirps.

A variety of radar communications may be utilized for many different applications. For instance, such communications may utilize Time Division Multiplexing (TDM) linear-chirp waveforms, with mm-Wave Frequency Modulation Continuous Wave (FMCW) automotive radar systems for constructing multiple-in-multiple-out (MIMO) virtual aperture to achieve higher angular resolution. The TDM approach may facilitate MIMO transmission as well as the processing of received signals, which may lead to lower cost and effective implementations.

While TDM radar signaling can be useful, time multiplexing of chirps transmitted by different transmitter antennas may result in mismatched phase delays, as may be caused by motion of targets. Further complications may be presented during TDM MIMO operation in which the MIMO transmitters are transmitting at different times, with relative motion between radar and the targets. For instance, between any two transmitting periods, the movement of the target may result in a change in the distance to the radar's phase center. This change in distance translates to change in the round-trip phase delay of the return signals, causing phase offsets across the subsequent transmission periods. Compensating for such mismatched phase delays can be particularly challenging. These and other matters have presented challenges to radar implementations, for a variety of applications.

SUMMARY

Various example embodiments are directed to issues such as those addressed above and/or others which may become apparent from the following disclosure concerning the communication of radar signals, and related determination of one or more positional characteristics of an object or objects in an environment. Such embodiments may utilize radar signals having a chirp interval time (CIT) between respective chirps that is different, relative to one another, for ascertaining the positional characteristics.

In certain example embodiments, aspects of the present disclosure involve communicating radar signals having different CITs between respective chirps in the radar signals. Positional characteristics of a target may be ascertained based upon the CITs of the radar signals as generated and the time between each corresponding chirp in reflections of the signals off the target. The radar signals may be communicated utilizing a combination of antennas to provide a virtual aperture.

In a specific embodiment, time division multiplexing (TDM) multi-input multi-output (MIMO) radar signals are communicated with chirps offset from other chirps by a CIT that is different for respective ones of the chirps. Positional characteristics are ascertained for a target from which the radar signals are reflected, based on the CIT between transmitted ones of the chirps and time between corresponding ones of the transmitted chirps that are reflected from the target and received. The radar signals may be communicated using a combination of apertures of respective antennas as a virtual aperture.

Other embodiments are directed to an apparatus comprising communication circuitry configured to communicate time division multiplexing (TDM) multi-input multi-output (MIMO) radar signals having chirps offset from other chirps by a chirp interval time (CIT) that is different for respective ones of the chirps. The apparatus includes processing circuitry configured to ascertain positional characteristics of a target from which the radar signals are reflected, based on the CIT between transmitted ones of the chirps and time between corresponding ones of the transmitted chirps that are reflected from the target. In some embodiments, the apparatus includes a plurality of antennas, each antenna having an aperture, with the communication circuitry being configured to communicate the radar signals using a combination of apertures of respective ones of the antennas as a virtual aperture.

In a more specific embodiment, an apparatus includes transmission circuitry, receiver circuitry, and radar processing circuitry. The transmission circuitry is configured to transmit TDM MIMO radar signals by transmitting, for each pulse in the radar signals, a chirp offset from other chirps in the pulse by a CIT, the CIT between each chirp being different than the CIT between other chirps. The receiver circuitry is configured to receive the radar signals as reflected from a target. The Radar processing circuitry is configured to ascertain positional characteristics of the target based on the CIT between each chirp in the transmitted radar signals and time between each corresponding chirp in the received radar signals.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
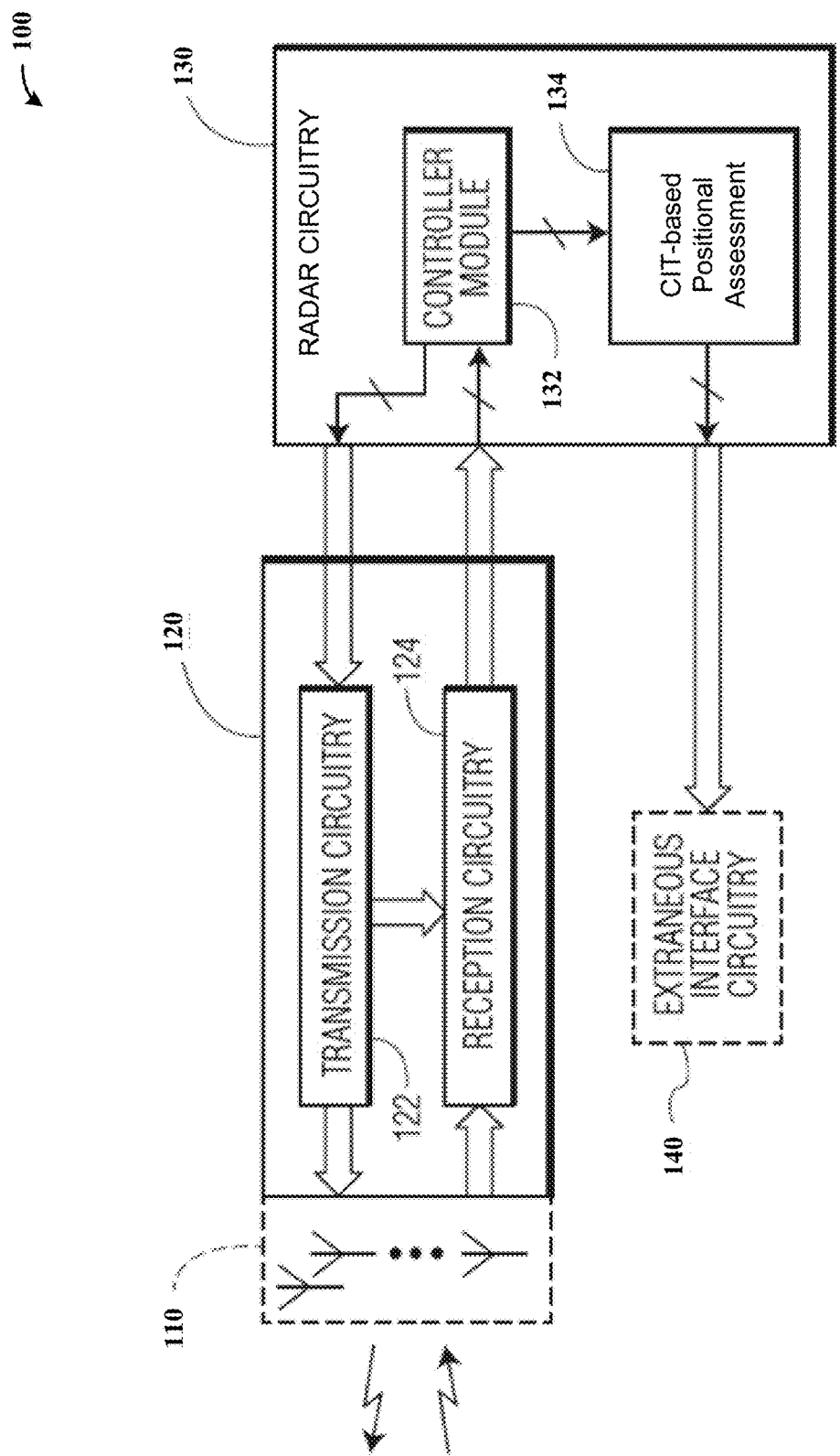
FIG. 1 shows a radar apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar communications. In certain implementations, aspects of the present disclosure have been shown to be beneficial when used in the context of the utilization of multiple-in-multiple-out (MIMO) radar communications, such as may be utilized in automotive environments. In some embodiments, MIMO radar communications are implemented using variable chirp offset for respective radar pulses/chirps. Certain implementations involve the utilization of multiple antennas to effect a virtual antenna aperture utilizing a combination of apertures of the respective antennas. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures or in separately-discussed embodiments or implementations, it will be appreciated that features from one figure or embodiment can be combined with features of another figure or embodiment even though the combination is not explicitly shown or explicitly described as a combination.

More specific embodiments are directed to resolving the Doppler ambiguity and multiple-in-multiple-out (MIMO) array phase compensation problems present in Time Division Multiplexing (TDM) MIMO radars, such as may be amenable for single frame processing with unknown Doppler ambiguity and three or more transmitters. TDM may be utilized in mm-Wave Frequency Modulation Continuous Wave (FMCW) automotive radars for constructing virtual aperture to achieve higher angular resolution. TDM may simplify MIMO transmission and RX processing leading to low-cost implementations. Phase error due to mismatched phase delays corresponding to relative motion between targets and radar may be compensated, based on variable CIT between respective chirps.

In a particular embodiment, the Doppler spectrum is dealiased to resolve radial velocity ambiguity of range-Doppler detection, and phase compensation is applied to reconstruct MIMO array measurements. The dealiasing may be achieved by creating up to N offset-start chirp sequences, each starting with a chirp of different transmitter. For each offset-start chirp sequence, N integer-2π hypothesis tests may be performed. For each offset-start chirp sequence, N compensated array phase vectors may be obtained under each hypothesis. The correct hypothesis may be identified as one that results in identical (or nearly identical) starting phases across at least 2 offset-start sequences. For instance, a threshold may be used to determine if overall differences in phase vectors are sufficiently low to be viewed as high confidence. Robust results may be obtained by varying the offset starts such that they are non-uniformly spaced. In this case, an incorrect hypothesis leads to differing phase curves amongst different offset-start cases. Correct hypothesis may thus be identified by checking consistency of the phase curve across offset-start cases. This approach may be implemented using single-frame processing and can be applied to multiple transmitters in a TDM MIMO radar systems.

More generally, and in connection with various embodiments, unwanted phase offsets may be compensated using radial velocity of the target and the time between the transmissions, with the radial velocity being ascertained from a corresponding Doppler frequency, with compensation of Doppler ambiguity as noted herein. The amount of phase offset may be calculated based on twice the distance travelled by the target between the two transmission events (e.g., as relating to the distance traveled for transmitted and reflected radar signals). The amount of phase offset for the i-th transmitter (A_i) may be estimated using the following equation, where (V_r) ^ is the estimated radial velocity of the target:

$$A_i = \frac{4\pi}{\lambda} * \hat{V}_r * \sum_{k=1}^{i-1} CIT_k \text{ [Rad]}$$

This radial velocity is estimated in consideration of Doppler ambiguity, to compensate under conditions as noted herein and implemented in accordance with one or more embodiments. For instance, offset starts of respective chirps may be adjusted and utilized with hypotheses as noted above, to identify a correct hypothesis and implement that identified hypotheses to resolve ambiguity.

Figure 3:
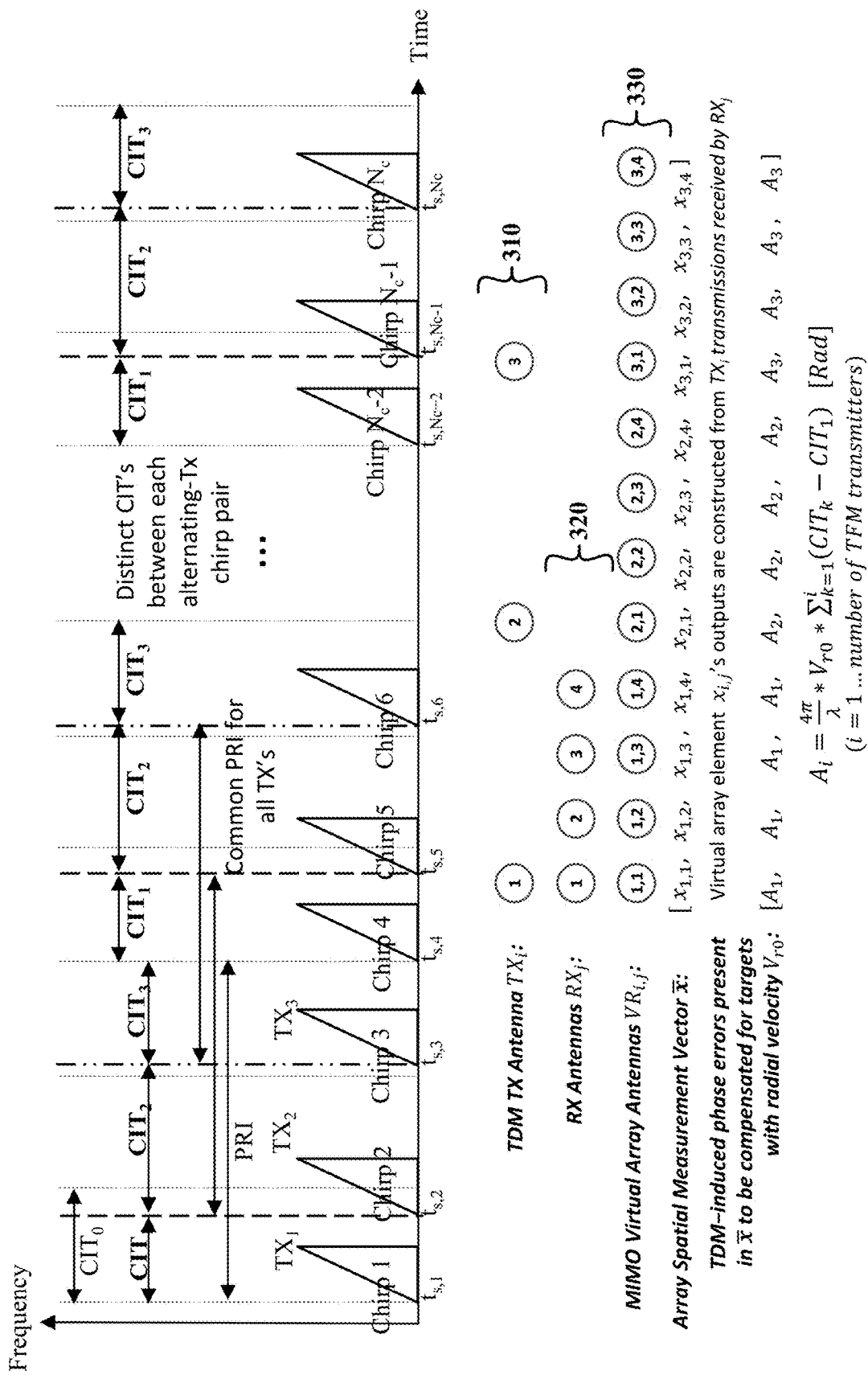
FIG. 3 shows an example chirp transmission approach with related array geometry, as may be implemented in accordance with one or more aspects of the present disclosure.

In certain embodiments, a correct hypothesis is detected as one in which a compensated array outputs phase curves that are consistent across all chirp-start cases (Both shapes and starting phases are all consistent), and incorrect hypotheses are detected as those in which as compensated array outputs phase curves that are inconsistent across any 2 chirp-start cases, in which neither shapes nor the starting phase are consistent. Each hypothesis may be tested by producing multiple phase compensation vectors, each based on a different starting chirp position in the TDM chirp sequence. For a N-TX TDM MIMO system, up to N starting positions are possible, in which each corresponds to one of the first N chirps (i.e. the first chirps of the N transmitters of the chirp sequence as depicted in FIG. 3).

In a more specific embodiment, an apparatus includes transmission circuitry, receiver circuitry, and radar processing circuitry. The transmission circuitry is configured to transmit TDM MIMO radar signals by transmitting, for each pulse in the radar signals, a chirp offset from other chirps in the pulse by a CIT, the CIT between each chirp being different than the CIT between other chirps. The receiver circuitry is configured to receive the radar signals as reflected from a target. The Radar processing circuitry is configured to ascertain positional characteristics of the target based on the CIT between each chirp in the transmitted radar signals and time between each corresponding chirp in the received radar signals.

In many instances, the transmission circuitry may operate with the receiver circuitry to communicate (transmit and/or receive) the radar signals using a combination of apertures of respective antennas as a virtual aperture. In this context, a virtual aperture refers to an aperture formed from a combination of antenna apertures. For instance, when three transmitters and four receivers are used with each having their own antenna, seven antennas are used. TDM MIMO may be used to form an enlarged virtual aperture with a size of 12 (3*4) antenna elements using the three transmitters and four receivers. More generally, a virtual aperture having a size of N*M elements may be generated by using (N+M)

elements in which N refers to a number of transmitters and M refers to a number of receivers.

The radar processing circuitry may be utilized in a variety of manners. In some implementations, the radar processing circuitry is configured to ascertain the positional characteristics of the target by compensating for phase error due to differences in time at which respective ones of the chirps are received, based on the CIT between each chirp. This may further involve compensating for speed of the target that causes differences in time at which respective ones of the chirps are received. For instance, a plurality of correction functions may be applied to the signals in which each correction function corresponds to a speed range of the target. One of the correction functions may be applied based on phase characteristics of the signals resulting from application of the correction functions thereto. Such approaches may yet further involve applying each of the plurality of correction functions to respective combinations of chirps received during a PRI, in which each respective combination of chirps using different ones of the chirps as a beginning chirp, and select the one of the correction functions that produces consistent curves (e.g., phase, shape, or both) when applied to the different combinations of chirps. One of the correction functions may be identified as an incorrect correction function in response to the incorrect correction function producing inconsistent curves when applied to the different combinations of chirps.

In some embodiments, the radar processing circuitry is configured to compensate for speed of the target that causes differences in time at which respective ones of the chirps are received as follows. A plurality of correction functions are applied to respective combinations of chirps received during a pulse repetition interval (PRI), each respective combination of chirps using different ones of the chirps as a beginning chirp and a common PRI. One of the correction functions that produces consistent curves when applied to the different combinations of chirps is selected, and the positional characteristics of the target are ascertained based on the consistent curves produced by the selected one of the correction functions.

The transmission circuitry may be configured to transmit each of the pulses using a common pulse repetition interval (PRI), in which (for each pulse) the sum of the CIT between each chirp is based on the PRI. The transmission circuitry and receiver circuitry may respectively include a plurality of transmitters and a plurality of receivers, each transmitter and receiver having an antenna. The transmission circuitry transmits the radar signals using a virtual aperture that utilizes a combination of apertures of the respective antennas of the plurality of transmitters and of the plurality of receivers.

In a specific embodiment, time division multiplexing (TDM) multi-input multi-output (MIMO) radar signals are communicated with chirps offset from other chirps by a CIT that is different for respective ones of the chirps. Positional characteristics are ascertained for a target from which the radar signals are reflected, based on the CIT between transmitted ones of the chirps and time between corresponding ones of the transmitted chirps that are reflected from the target and received. The radar signals may be communicated using a combination of apertures of respective antennas as a virtual aperture. For instance, the radar signals may be transmitted by transmitting each of the pulses using a common pulse repetition interval (PRI) in which, for each pulse, the sum of the CIT between each chirp is based on the PRI.

Ascertaining the positional characteristics of the target may include compensating for phase error due to differences in time at which respective ones of the chirps are received, based on the CIT between each chirp. Speed of the target that causes differences in time at which respective ones of the chirps are received may further be compensated by applying a plurality of correction functions to the signals, each correction function corresponding to a speed range of the target. One of the correction functions is then selected based on phase characteristics of the signals resulting from application of the correction functions thereto.

In some implementations, each of the correction functions is applied to respective combinations of chirps received during a pulse repetition interval (PRI), each respective combination of chirps using different ones of the chirps as a beginning chirp. One of the correction functions that produces consistent curves when applied to the different combinations of chirps is then selected. One of the correction functions may be identified as an incorrect correction function in response to the incorrect correction function producing inconsistent curves when applied to the different combinations of chirps. In such instances, one of the correction functions that is not the incorrect correction function may thus be selected.

In some implementation, compensation is effected for speed of the target that causes differences in time at which respective ones of the chirps are received as follows. A plurality of correction functions are applied to respective combinations of chirps received during a pulse repetition interval (PRI), each respective combination of chirps using different ones of the chirps as a beginning chirp and a common PRI. One of the correction functions that produces consistent curves when applied to the different combinations of chirps is selected and used to obtain positional characteristics of the target.

In certain implementations, the radar signals may be received using a plurality of receivers in which each receiver has an antenna. The radar signals may be transmitted using a plurality of transmitters in which each transmitter has an antenna. The radar signals may be communicated using a virtual aperture that utilizes a combination of apertures of the respective antennas of the plurality of transmitters and of the plurality of receivers.

Turning now to the figures, FIG. 1 shows a radar apparatus 100, as may be implemented in accordance with one or more embodiments. The apparatus 100 includes an antenna array 110, radar communication circuitry 120, and radar processing circuitry 130 (which may further interface with interface circuitry 140, for example automotive interface circuitry). The antenna array 110 includes a plurality of antennas, and the radar communication circuitry 120 includes transmission circuitry 122 and reception circuitry 124 (e.g., a plurality of transmitters and receivers). The radar processing circuitry 130 (e.g., radar MCPU) includes a controller module 132 and CIT-based positional assessment circuitry 134.

These components of apparatus 100 are operable to provide TDM, MIMO radar communications, in connection with signals communicated with the radar processing circuitry 130, utilizing variable CITs and as may be implemented in accordance with one or more embodiments herein. For instance, positional characteristics of a target from which radar signals transmitted by the transmission circuitry 122 via the antenna array 110, and which are reflected from the target and received by the reception circuitry via the antenna array, may be ascertained based on the CIT between each chirp in the transmitted signals and time between each corresponding chirp in the received signals. In certain embodiments, the transmission circuitry 122 and reception circuitry 124 are respectively implemented in accordance with the transmitter and receiver circuitry as characterized in communication circuitry 220 in FIG. 2.

Figure 2:
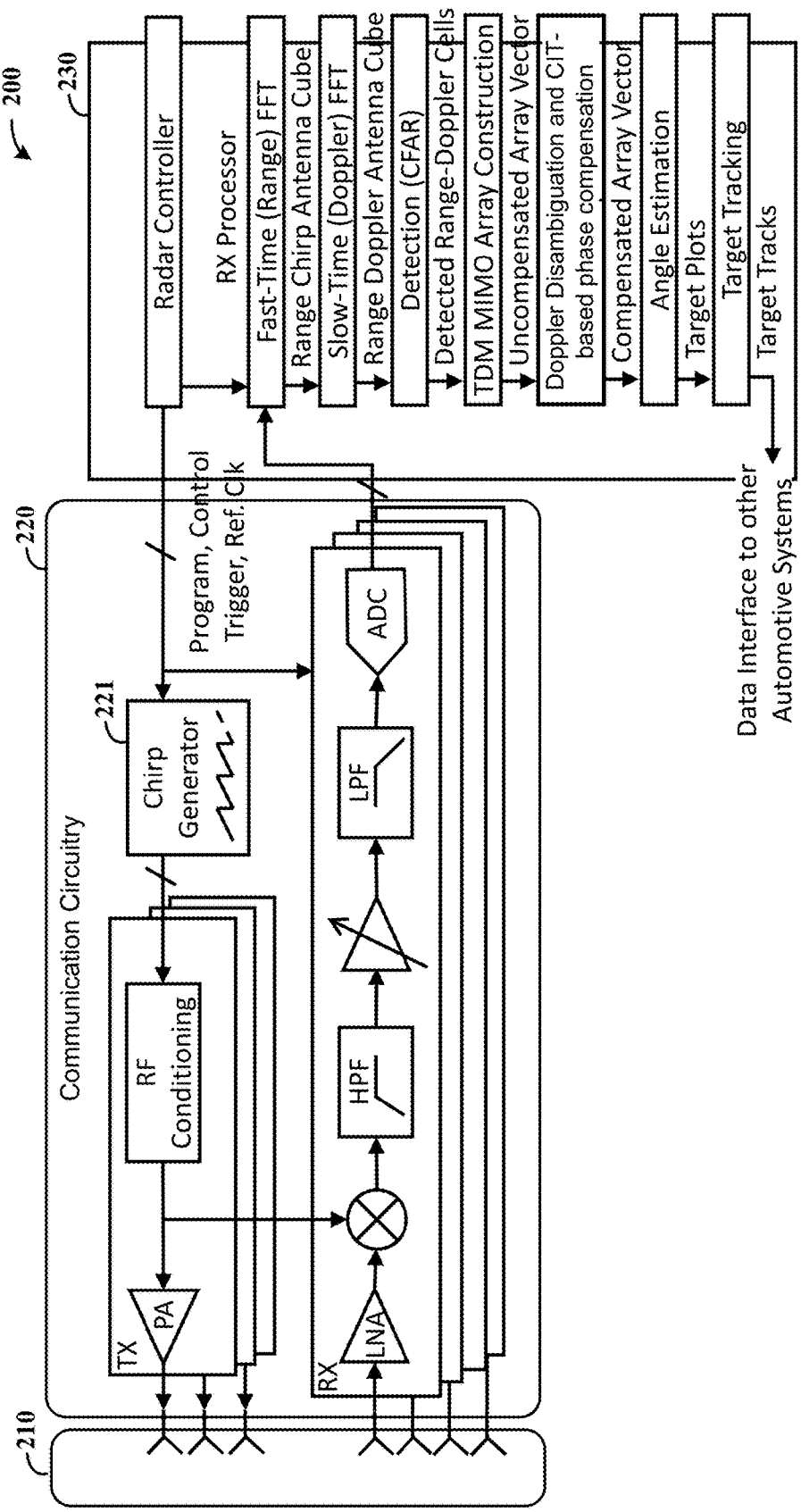
FIG. 2 shows a TDM MIMO linear-chirp radar apparatus with CIT-based phase compensation, as may be utilized in accordance with the present disclosure.

FIG. 2 shows notional TDM MIMO linear-chirp FMCW radar apparatus 200 with CIT-based phase compensation, as may be utilized for example with 76~81 GHz FMCW automotive radar systems. The apparatus 200 includes an antenna array 210, communication circuitry 220 and radar processing circuitry 230, and is operable to transmit radar signals using variable CITs and utilize this variation to effect phase compensation. The communication circuitry 220 includes a plurality of transmitters and receivers (e.g., three transmitters and four receivers). The transmitters may include a chirp generator 221 operable to generate respective chirps at variable CITs, and may include other transmission circuitry such as conditioning and amplifier circuits, and operate in response to radar control circuitry within the radar processing circuitry 230.

The receivers may include amplifier, filtering and other circuits as useful for receiving radar signals. For instance, each receiver may mix a return radar reflection with a transmitted chirp and filter the result to generate deramped IF (intermediate frequency) signals to be sampled by ADCs and processed by a DSP to produce range and Doppler responses for each receive channel. For TDM MIMO, multiple transmitters may transmit in sequence so the signal can be separately received at all receivers at different CITs. The range-Doppler response maps of the receivers from the transmitted CIT periods may be aggregated to form a complete MIMO array measurement data cube consisting of range-Doppler response maps of the antenna elements of a constructed MIMO virtual array (e.g., a MIMO array as depicted in FIG. 3). The range-Doppler responses may be non-coherently integrated and target detection may be attempted on the energy-combined range-Doppler map. A detection algorithm, such as may relate to variants of the CFAR algorithm, may be used to identify the range-Doppler cells in which targets may be present. For each detection cell, the array measurement vector may then be extracted and processed for identifying the incident angles of any target returns contained in the cell. The transmitters in communication circuitry 220 may set starting positions of each transmitters' first chirps with distinct offsets (e.g., with different and non-uniform CIT's, and which may have similar or identical PRIs).

Reflected radar signals received via the antenna array 210 and communication circuitry 220 are passed to the radar processing circuitry 230. The received signals are processed accordingly by utilizing the CIT interval variation for Doppler disambiguation and CIT-based phase compensation as part of signal processing steps/functions, and generates an output array vector with phase compensation, addressing issues as characterized herein. The radar processing circuitry 230 may further carry out angle estimation and target tracking, using the compensated output array vectors, for tracking positional characteristics of targets from which reflections are received. Such target information may further be provided via a data interface to external systems, such as automotive systems.

FIG. 3 shows an example chirp transmission approach with related antenna array geometry, as may be implemented in accordance with one or more embodiments (for instance, with the apparatuses in FIGS. 1 and/or 2). The plot depicts three CIT's for three transmitters, Tx1, Tx2 and Tx3, with $CIT_1$ corresponding to Tx1 and Tx2's first chirps, $CIT_2$ corresponding to Tx2 and Tx3's first chirps, and $CIT_3$ corresponding to Tx3's first chirp and Tx1's second chirp. These CITs differ from each other, and the PRI (duration between any two adjacent chirps of the same transmitter) remains the same.

Transmitter antenna array 310 and receiver antenna array 320 are combined and utilized for providing a MIMO virtual antenna array 330 having the indicated combinations of antennas. Corresponding spatial measurement vectors and phase errors are shown.

In connection with one or more embodiments, it has been recognized/discovered that this chirp offset facilitates recovering a correct radial velocity by testing three virtual chirp sequences (or N sequences for the case of N-TX TDM), each starting with a different transmitter. For instance, the non-uniform CIT pattern combined with the formation of chirp sequences at different chirp start positions may be used to construct three sets of hypotheses (or N sets for the case of N-TX TDM) for testing potential phase correction values to be applied to the MIMO array's output. Each hypothesis in the set corresponds to a potentially correct way to compensate the phase of the MIMO array measurements. Accordingly, it has been recognized/discovered that the correct hypothesis can be identified by comparing the compensated MIMO array's phase measurements across the multiple chirp starting position cases. The correct hypothesis may provide identical (or nearly identical) phase measurements (as a function of MIMO virtual elements) across all chirp-start position cases, while incorrect hypotheses result in non-identical phase measurements. Accordingly, an ambiguity present in an apparent radial velocity corresponding to a range Doppler cell such may be determined such that the true radial velocity can be recovered and used to remove phase errors in the MIMO array measurement, facilitating angle estimation.

In a particular embodiment, resolution of such ambiguities and related angle estimation may be carried out as follows. A chirp schedule us defined with non-uniform CITs and the same PRI. This may, for example, include offsetting and/or shifting transmitter sub-chirp sequences by small and distinct amounts in time. Multiple chirp sequences are formed, each starting with a different transmitter. The number of chirps in a sequence may be the same for all different chirp-start cases. Doppler spectrums of all receivers are computed for each Tx's sub-chirp sequence of each chirp-start case. Each Doppler cell of interest (e.g., usually those passing detection criteria) are processed according to hypothesis testing rules, for instance as characterized above. A set of hypotheses may be established for each Doppler cell for testing, and a correct hypothesis is identified as a hypothesis that provides corresponding phase measurements across each chirp start-position. Phase compensation is applied to the Doppler cell's outputs according to the identified hypothesis. Phase discontinuity present in the TDM MIMO virtual array measurements is removed upon the application of the phase compensation. Correct angle estimation may then be performed based on the phase-compensated array measurements.

It has further been recognized that the use of non-uniform CIT's leads to changing phase shapes in the compensated MIMO array outputs with different chirp start positions under false hypotheses. This may relate to an amount of phase compensation that is proportional to the time elapsed from the original chirp start. By making the CIT's unequal, different starting positions result in different residual phase errors if a hypothesis is not true. The residual phase errors in array measurements become zero under the correct hypothesis regardless of the starting chirp (or transmitter) of the sequences. On the other hand, if the CIT's are equal, under false hypotheses even though the amount of residual phase error will not be reduced to zero, the relative residual phase errors to the first element's phase error remain the same across different chirp start positions. In this case, only the residual phase error of the first element differs with different starting chirp positions. Accordingly, distinct CIT's that lead to varying phase shapes across different chirp start positions under false hypothesis may be utilized, for instance with CIT values based on distinct values such as co-prime numbers.

The construction of the hypotheses and the hypothesis testing method may be carried out as follows. For an N-TX M-RX TDM MIMO radar system, at a Doppler cell's output a total of N*M measurements can be obtained, which form the MIMO virtual array measurements. These measurements contain phase errors which are compensated. Specifically, MIMO array measurements are made for all chirp-start position cases. For N transmitters, up to N chirp start positions are available, such that at least two and up to N virtual chirp sequences may be constructed. For each MIMO array measurement vector, predefined phase compensations are applied according to each hypothesis, and a phase-compensated MIMO array measurement vector is obtained for each hypothesis. The phase compensation values under each hypothesis is determined based on the following equation:

$$A_{m,i}^k = -\frac{\sum_{p=1}^{i-1} CIT_p}{PRI}[\hat{A} + 2\pi(m-1) + kN*2\pi]$$

for $i, m \in \{1, 2, 3, \ldots, N\}, k \in \{0, \pm 1, \pm 2, \ldots\}$ where CITp is the p-th CIT of a chirp-start case (for simplicity, in above expression it is implied that the value of CITp differs for different chirp-start cases); Â is the apparent or observed phase shift across a the duration of PRI; N is the number of TDM transmitters; i is the index of the transmitter contributing to the virtual array measurement the phase compensation is applied to; and k and m are ambiguity factors where m is the fine ambiguity factor in natural number multiples of $2\pi$ and k is the coarse ambiguity factor in integer multiples of $2N\pi$; and $A_{m,i}^k$ is the amount of phase compensation applicable to all MIMO array measurements involving transmitter-i (and any receiver) under the {m,k}-th hypothesis. Further, the hypotheses and/or the order of Â may be different. The extent of the search is controlled by the absolute value of k, which is predetermined based on system design or by a search stop criterion.

Phase error compensation can be tailored to respective chirp-start positions. In certain examples, a chirp sequence starts at the position of first chirp (e.g., the first chirp of a transmitter's chirp sequence), and the phase compensation vector under hypothesis:

$H[m-1+Nk]$ is: $[A_1, A_2, A_3, \ldots, A_N] =$ $$\left[0, -\frac{[\hat{A} + kN*2\pi + (m-1)*2\pi]*CIT_1}{PRI},\right.$$

$$-\frac{[\hat{A} + kN*2\pi + (m-1)*2\pi]*(CIT_1 + CIT_2)}{PRI},$$

$$\left.\ldots, -\frac{[\hat{A} + kN*2\pi + (m-1)*2\pi]*\sum_{p=1}^{N-1} CIT_p}{PRI}\right]$$

The following relation may be implemented, with highlighting arrows:

$$\begin{bmatrix} H-Chirpstart1 \\ H-Chirpstart2 \\ H-Chirpstart3 \\ \vdots \\ H-ChirpstartN \end{bmatrix} = \begin{bmatrix} A_1 & A_2 & A_3 & \ldots & A_{N-2} & A_{N-1} & A_N \\ A_2 & A_3 & A_4 & \ldots & A_{N-1} & A_N & A_1 \\ A_3 & A_4 & A_5 & \ldots & A_N & A_1 & A_2 \\ \vdots & \vdots & \vdots & & \vdots & \vdots & \vdots \\ A_N & A_1 & A_2 & \ldots & A_{N-3} & A_{N-2} & A_{N-1} \end{bmatrix} + \begin{bmatrix} 0 \\ A_2 \\ A_3 \\ \vdots \\ A_N \end{bmatrix}$$

Accordingly, H-Chirpstart S can be found by circular shifting the first row $[A_1, A_2, A_3, \ldots, A_N]$ (S−1) times to the left and adding $A_S$ ($A_1$=0), where $[A_1, A_2, A_3, \ldots, A_N]$ of any hypothesis H[m−1+Nk] can be found using the approach noted above.

The consistency check may be implemented by first computing the modulo-$2\pi$ differences between any pair of MIMO array phase vectors of different chirp-start cases under a hypothesis, and then the hypothesis discrepancy, $D_{\{m-1+Nk\}}$, may be computed as the sum of all the phase differences from all unique pairs of the chirp-start cases, using the following equation:

$$D_{\{m-1+Nk\}} = \sum_{s1=1}^{N-1} \sum_{s2=s1+1}^{N} \sum_{i=1}^{N} \sum_{j=1}^{M} \mathrm{mod}\left(\angle\check{x}_{i,j,m}^{k,s1} - \angle\check{x}_{i,j,m}^{k,s2}, 2\pi\right)$$

where $\angle\check{x}_{i,j,m}^{k,s1}$ denotes the phase of the compensated MIMO array output of the {TXi, RXj}-th element under the {m, k}-th hypothesis (e.g., H[m−1+Nk]) and with the s1-th chirp-start position.

The process may be repeated until discrepancy values are obtained for hypotheses to be implemented (e.g., up to a predetermined value of ±k). The above expression may compute the discrepancy metric to its full extent to achieve desirable performance, however certain implementations implement a single component {s1 s2}. A selected hypothesis may be identified as one with minimum discrepancy that translates to highest consistency, relative to others.

In some implementations, minimal discrepancy (i.e. highest consistency) is checked against a predetermined threshold (TH) for confidence levels using the following rules:
  If $D_i$<TH, the result is deemed as a HIGH confidence one; and
  If $D_i$>TH, the result is deemed as a LOW confidence one.

Figure 4A:
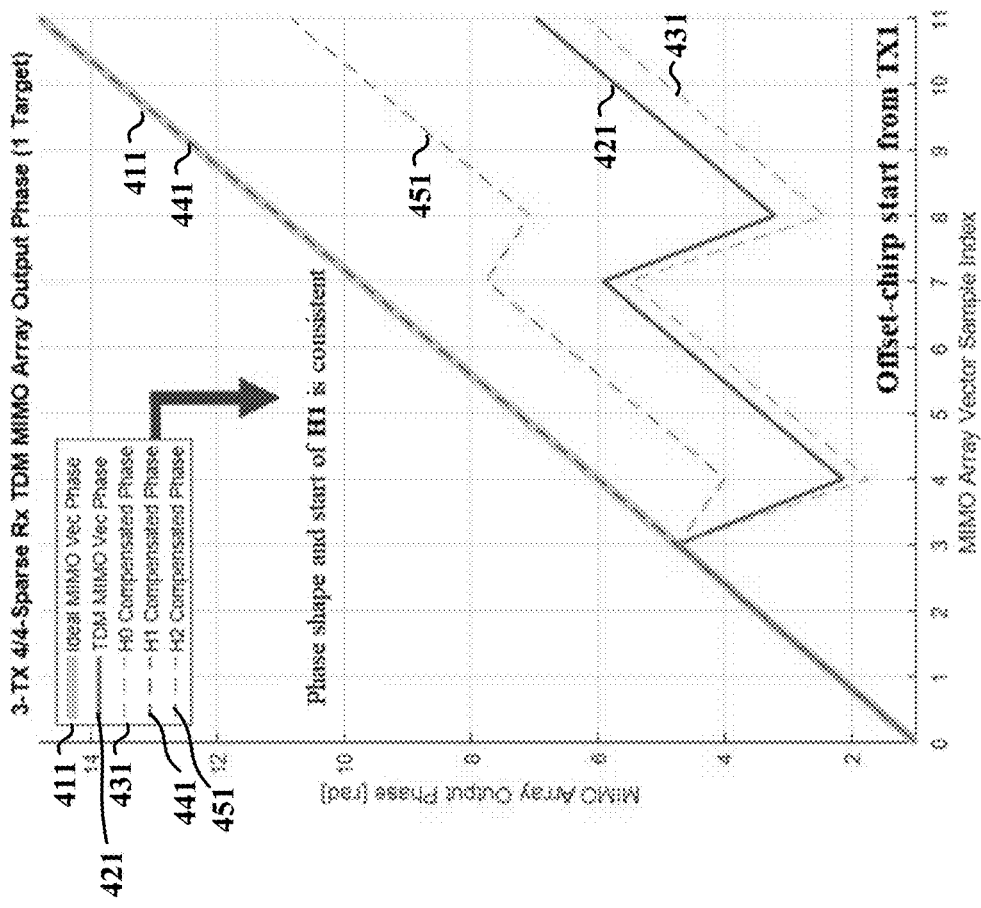
FIGS. 4A-4D show a hypothesis analysis approach, in accordance with the instant disclosure.
Figure 4B:
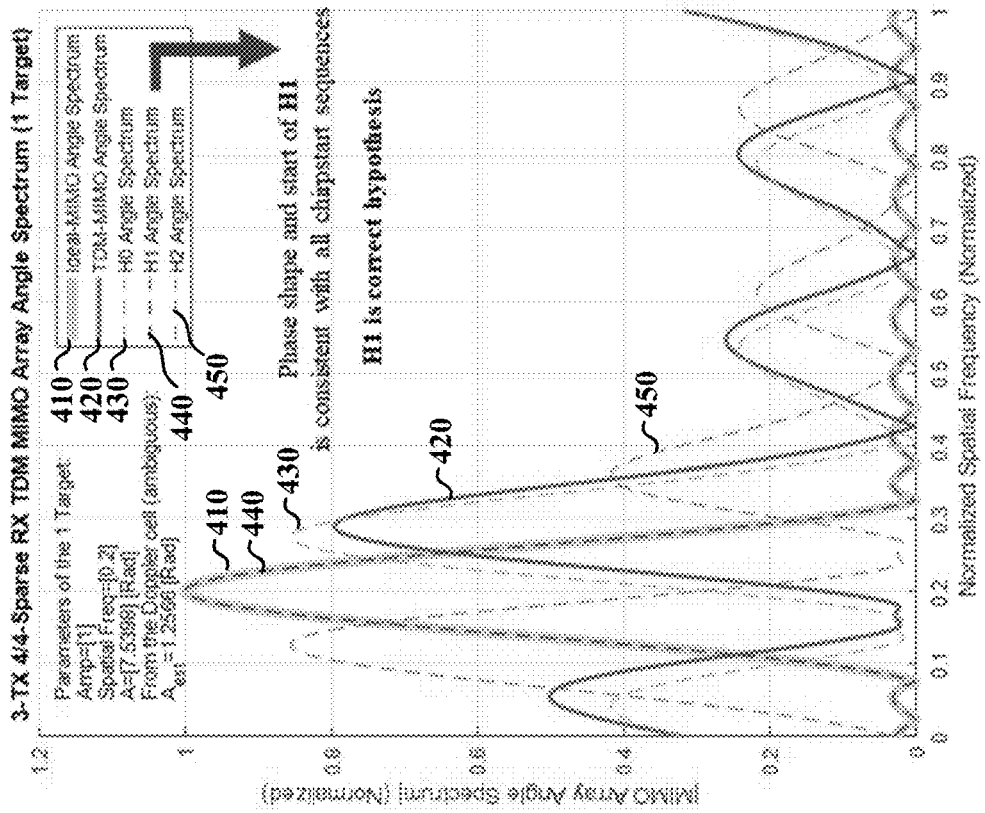
Figure 4D:
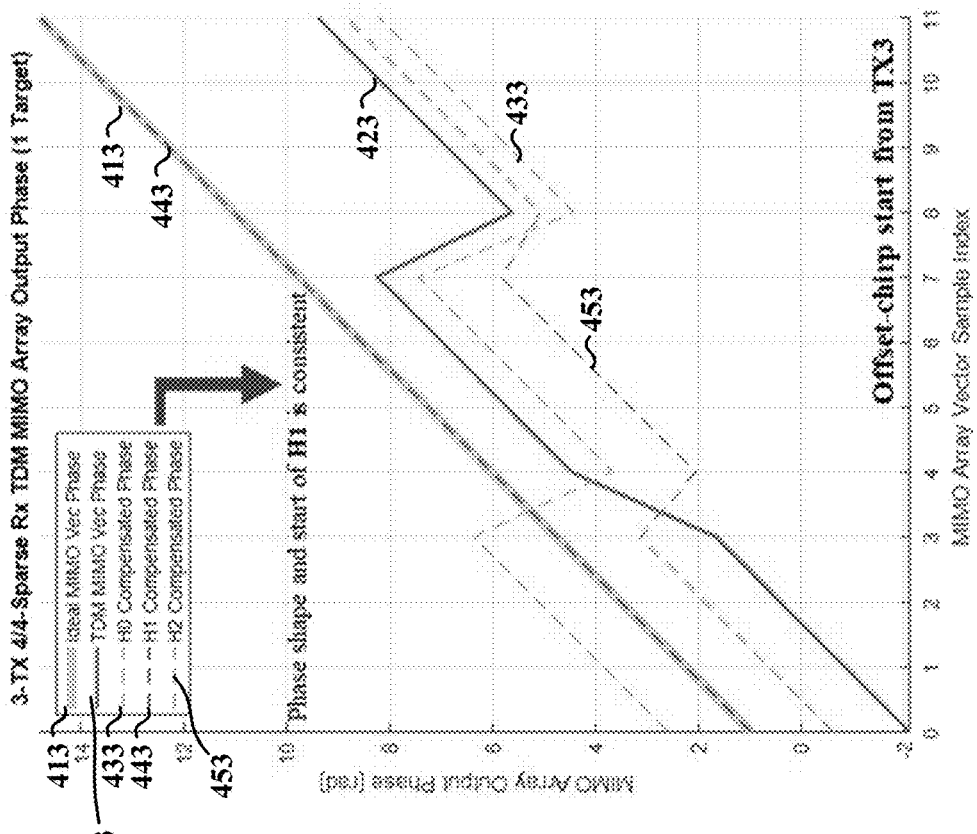
Figure 4C:
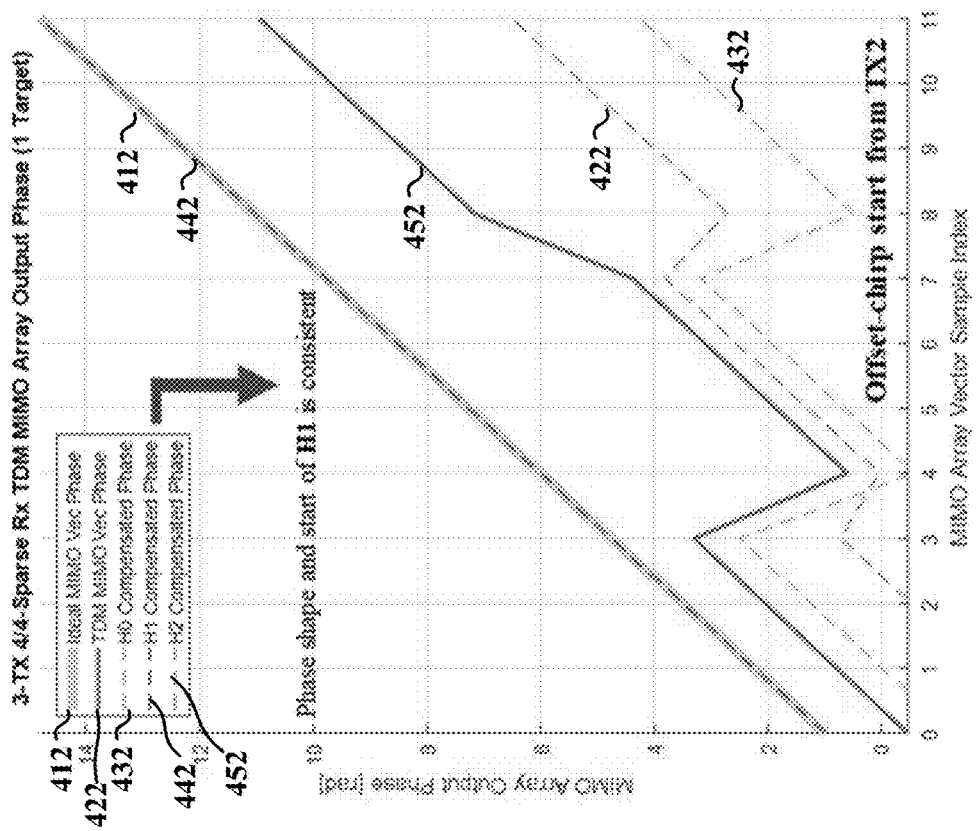

FIGS. 4A-4D show a hypothesis analysis approach with a 1-target case for ULA (uniform linear array), and with A=7.54 [Rad] (within $2\pi$ to $4\pi$), in accordance with the instant disclosure. FIG. 4A depicts array angle spectrum, and FIGS. 4B-4D depict output phase for three transmitters with respective offset chirp starts. Referring to FIG. 4A, plots 410, 420, 430, 440 and 450 depict angle spectrum respectively for an ideal MIMO communication, TDM-MIMO communication, and under three hypotheses II0, II1 and II2. FIGS. 4B-4D show vector phase/compensated phase for these communications/hypotheses and numbered similarly, with plots 411/421/431/441/451 in FIG. 4B (first transmitter), 412/422/432/442/452 in FIG. 4C (second transmitter), and 413/423/433/443/453 in FIG. 4D (third transmitter). As depicted in FIGS. 4B-4D, the dashed lines for H1 441, 442 and 443 are consistent with each other across all three chirp start position cases, while the other dashed lines of other hypotheses differ from case to case. Therefore, hypothesis H1 can be selected as the desirable and correct hypothesis. For demonstration purpose, the selected hypothesis H1 may most closely match the predetermined ideal/correct MIMO vector phase 411/412/413 (which may be unknown in real measurement), indicating H1 is a desirable hypothesis.

The phase measurements of each phase-compensated MIMO array measurement under each hypothesis and chirp-start case may be computed. The phase measurement vector can be viewed as a function of an MIMO array's antenna index. A hypothesis that results in identical (or about identical) post-compensation phase measurement vector across all chirp-start cases may be identified as a correct hypothesis. Incorrect hypotheses may be identified as those that result in non-identical phase vectors between any two chirp-start cases.

Certain embodiments are directed toward implementation with uniform CITs, in which false hypotheses are identified as those in which the starting phases (of the compensated MIMO array) differ with changing starting chirp positions, and with the shape of phase curves remaining the same. True hypotheses may be identified as those in which both the starting phase and the shape of the post-compensation phase measurement remain unchanged with different starting chirp position.

As examples, the Specification describes and/or illustrates aspects useful for implementing the claimed disclosure by way of various circuits or circuitry which may be illustrated as or using terms such as blocks, modules, device, system, unit, controller, MCPU, and/or other circuit-type depictions (e.g., reference numerals 120, 130, 132 and 134 of FIG. 1 may depict a block/module as described herein). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a micro controller and processing unit, or code-programmed/configured MCPU), in one example the logic circuitry may carry out a process or method (sometimes "algorithm") by performing hypotheses evaluation and compensation. Yet another process or method in this context would be recognized in connection with the functions/activities associated with the chirp sequences shown in FIG. 3 and implemented in connection with the controller module 132 in FIG. 1.

In certain of the above-discussed embodiments, one or more modules are discrete logic circuits or programmable logic circuits configured and arranged for implementing these operations/activities, as may be carried out in the approaches shown in FIGS. 1-3. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described for testing hypotheses is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. As an example, different numbers of transmitters and receivers may be used, and different CIT intervals may be used. Such modifications do not depart from the true spirit and scope of various aspects of the disclosure, including aspects set forth in the claims.

What is claimed is:

1. An apparatus comprising:
transmission circuitry configured to transmit time division multiplexing (TDM) multi-input multi-output (MIMO) radar signals by transmitting, in each of a purality of pulse repetitions intervals (PRIs), a plurality of chirps, wherein each pair of adjacent chirps of the plurality of chirps in each PRI is offset by a respectively different chirp interval time (CIT), such that a CIT between given pair of adjacent chirps in a given PRI is different from CITs between any other pair of adjacent chirps in the given PRI;
receiver circuitry configured to receive the radar signals as reflected from a target; and
radar processing circuitry configured to ascertain positional characteristics of the target based on the CITs between adjacent chirps in the transmitted radar signals and time between each corresponding chirp in the received radar signals.

2. The apparatus of claim 1, wherein the transmission circuitry is configured and arranged with the receiver circuitry to communicate the radar signals using a combination of apertures of respective antennas as a virtual aperture.

3. The apparatus of claim 1, wherein the radar processing circuitry is configured to ascertain the positional characteristics of the target by compensating for phase error due to differences in time at which respective ones of the chirps are received, based on the CIT between each chirp.

4. The apparatus of claim 3, wherein the radar processing circuitry is configured to compensate for speed of the target that causes differences in time at which respective ones of the chirps are received, by:
applying a plurality of correction functions to the signals, each correction function corresponding to a speed range of the target; and
selecting one of the correction functions based on phase characteristics of the signals resulting from application of the correction functions thereto.

5. The apparatus of claim 4, wherein the radar processing circuitry is configured to:
- apply each of the plurality of correction functions to respective combinations of chirps received during a PRI, each respective combination of chirps using different ones of the chirps as a beginning chirp; and
- select the one of the correction functions that produces consistent curves when applied to the different combinations of chirps.

6. The apparatus of claim 5, wherein the radar processing circuitry is configured to identify one of the correction functions as an incorrect correction function in response to the incorrect correction function producing inconsistent curves when applied to the different combinations of chirps.

7. The apparatus of claim 1, wherein the radar processing circuitry is configured to compensate for speed of the target that causes differences in time at which respective ones of the chirps are received, by:
- applying a plurality of correction functions to respective combinations of chirps received during a PRI, each respective combination of chirps using different ones of the chirps as a beginning chirp and a common PRI;
- selecting one of the correction functions that produces consistent curves when applied to the different combinations of chirps; and
- ascertaining the positional characteristics of the target based on the consistent curves produced by the selected one of the correction functions.

8. The apparatus of claim 1, wherein:
- the transmission circuitry is configured to transmit pulses using a common PRI, and
- for each pulse, the sum of the CIT between each chirp is based on the common PRI.

9. The apparatus of claim 1, wherein:
- the transmission circuitry includes a plurality of transmitters, each transmitter having an antenna;
- the receiver circuitry includes a plurality of receivers, each receiver having an antenna; and
- the transmission circuitry is configured to transmit the radar signals using a virtual aperture that utilizes a combination of apertures of the respective antennas of the plurality of transmitters and of the plurality of receivers.

10. An apparatus comprising:
- communication circuitry configured to communicate time division multiplexing (TDM) multi-input multi-output (MIMO) radar signals by transmitting during each of a plurality of pulse repetition intervals (PRIs), a plurality of chirps, wherein each pair of adjacent chirps of the plurality of chirps during each PRI is offset by a respectively different chirp interval time (CIT), and
- processing circuitry configured to ascertain positional characteristics of a target from which the radar signals are reflected, based on the CITs between transmitted adjacent chirps and based on time between corresponding ones of the transmitted chirps that are reflected from the target.

11. The apparatus of claim 10,
- further including a plurality of antennas, each antenna having an aperture; and
- wherein the communication circuitry is configured to communicate the radar signals includes using a combination of apertures of respective ones of the plurality of antennas as a virtual aperture.

12. A method comprising:
- communicating time division multiplexing (TDM) multi-input multi-output (MIMO) radar signals by transmitting, during each of plurality of pulse reprtition intervals (PRIs), a plurality of chirps, wherein each pair of adjacent chirps of the plurality of chirps during each PRI is offset by a respectively different chirp interval time (CIT); and
- ascertaining positional characteristics of a target from which the radar signals are reflected, based on the CITs between transmitted adjacent chirps and based on time between corresponding ones of the transmitted chirps that are reflected from the target.

13. The method of claim 12, wherein communicating the radar signals includes using a combination of apertures of respective antennas as a virtual aperture.

14. The method of claim 12, wherein ascertaining the positional characteristics of the target includes compensating for phase error due to differences in time at which respective ones of the chirps are received, based on the CIT between each chirp.

15. The method of claim 14, including compensating for speed of the target that causes differences in time at which respective ones of the chirps are received by:
- applying a plurality of correction functions to the signals, each correction function corresponding to a speed range of the target; and
- selecting one of the correction functions based on phase characteristics of the signals resulting from application of the correction functions thereto.

16. The method of claim 15, wherein:
- each of the plurality of correction functions is applied to respective combinations of chirps received during a PRI, each respective combination of chirps using different ones of the chirps as a beginning chirp; and
- selecting the one of the correction functions includes selectin one of the correction functions that produces consistent curves when applied to the different combinations of chirps.

17. The method of claim 16, including identifying one of the correction functions as an incorrect correction function in response to the incorrect correction function producing inconsistent curves when applied to the different combinations of chirps, wherein selecting the one of the correction functions includes selecting one of the correction functions that is not the incorrect correction function.

18. The method of claim 12, including compensating for speed of the target that causes differences in time at which respective ones of the chirps are received by:
- applying a plurality of correction functions to respective combinations of chirps received during a PRI, each respective combination of chirps using different ones of the chirps as a beginning chirp and a common PRI;
- selecting one of the correction functions that produces consistent curves when applied to the different combinations of chirps; and
- ascertaining the positional characteristics of the target using the selected one of the correction functions.

19. The method of claim 12, wherein transmitting the radar signals includes transmitting each of the chirps using a common PRI in which, for each pulse, the sum of the CIT between each chirp is based on the common PRI.

20. The method of claim 12,
- wherein receiving the radar signals includes using a plurality of receivers in which each receiver has an antenna, and wherein transmitting the radar signals includes using a plurality of transmitters in which each transmitter has an antenna; and
- further including communicating the radar signals using a virtual aperture that utilizes a combination of apertures of the respective antennas of the plurality of transmitters and of the plurality of receivers.

* * * * *